United States Patent
Park

(10) Patent No.: US 8,438,519 B2
(45) Date of Patent: May 7, 2013

(54) VIA-NODE-BASED ELECTROMIGRATION RULE-CHECK METHODOLOGY

(75) Inventor: Young-Joon Park, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 797 days.

(21) Appl. No.: 12/041,984

(22) Filed: Mar. 4, 2008

(65) Prior Publication Data
US 2009/0228856 A1    Sep. 10, 2009

(51) Int. Cl.
*G06F 17/50* (2006.01)

(52) U.S. Cl.
USPC ............. 716/115; 716/56; 716/109; 716/120; 716/132; 716/133; 716/136; 703/13; 703/14; 702/179; 702/180; 702/181

(58) Field of Classification Search .................. 716/4, 5, 716/11–13, 56, 109, 115, 120, 132–133, 716/136; 703/13–14; 702/179–180
See application file for complete search history.

(56) References Cited

U.S. PATENT DOCUMENTS

| | | | | |
|---|---|---|---|---|
| 5,831,867 A * | 11/1998 | Aji et al. | .......................... | 716/4 |
| 6,028,440 A * | 2/2000 | Roethig et al. | .............. | 324/765 |
| 6,072,945 A * | 6/2000 | Aji et al. | .......................... | 716/5 |
| 6,195,790 B1 * | 2/2001 | Tanimoto et al. | .............. | 716/20 |
| 6,822,473 B1 * | 11/2004 | Hau-Riege et al. | ........... | 324/766 |
| 7,215,029 B1 * | 5/2007 | Umemura | ..................... | 257/765 |
| 2002/0083403 A1 * | 6/2002 | Murayama | ........................ | 716/5 |
| 2003/0066036 A1 * | 4/2003 | Mau | .................................. | 716/2 |
| 2003/0226121 A1 * | 12/2003 | Yokogawa | ......................... | 716/1 |
| 2005/0239283 A1 * | 10/2005 | Horikoshi et al. | ............ | 438/633 |
| 2006/0071319 A1 * | 4/2006 | Nishimura | ..................... | 257/691 |
| 2006/0080630 A1 * | 4/2006 | Lin | .................................. | 716/11 |
| 2006/0160354 A1 * | 7/2006 | Zhang et al. | .................. | 438/636 |
| 2006/0226530 A1 * | 10/2006 | Dinter et al. | .................. | 257/691 |
| 2007/0278484 A1 * | 12/2007 | Feustel et al. | ................... | 257/48 |
| 2008/0028352 A1 * | 1/2008 | Birch et al. | ..................... | 716/12 |
| 2008/0127020 A1 * | 5/2008 | Rittman | .......................... | 716/10 |
| 2008/0141196 A1 * | 6/2008 | Ohshima et al. | ................. | 716/5 |
| 2008/0157075 A1 * | 7/2008 | Feustel et al. | ................... | 257/48 |
| 2009/0031264 A1 * | 1/2009 | Rittman et al. | .................. | 716/5 |
| 2009/0077508 A1 * | 3/2009 | Rubin et al. | ..................... | 716/4 |
| 2009/0250818 A1 * | 10/2009 | Zhang et al. | ................. | 257/751 |

* cited by examiner

*Primary Examiner* — Nghia Doan
(74) *Attorney, Agent, or Firm* — Alan A.R. Cooper; Wade J. Brady III; Frederick J. Telecky, Jr

(57) ABSTRACT

A method of method of manufacturing an integrated circuit. The method comprises performing an electromigration reliability rule-check for at least one of via node of an integrated circuit, including: calculating a net effective current density of the via node. Calculating the net effective current density including determining a sum of effective current densities for individual leads that are coupled to the via node. Leads configured to transfer electrons away from said via node are assigned a positive polarity of the effective current density. Leads configured to transfer electrons towards the via node are assigned a negative polarity of the effective current density.

20 Claims, 5 Drawing Sheets

VIA-NODE-BASED ELECTROMIGRATION RULE-CHECK METHODOLOGY

TECHNICAL FIELD OF THE INVENTION

The present invention is directed, in general, to methods of manufacturing integrated circuits, and more particularly, to design layout rule-checking methodologies for integrated circuits that meet electromigration reliability requirements.

BACKGROUND OF THE INVENTION

Electromigration (EM) is a major interconnection failure mechanism in integrated circuits (ICs). EM is caused by the transport of metal atoms when an electric current flows through interconnect structures (e.g., via, leads, etc.) in the IC. For instance, EM can cause metal atoms to migrate through a metal interconnect, thereby causing the formation of a void, and cause a short circuit, in the interconnect. EM-induced atomic mass transport increases with increasing current density. As the minimum feature size of interconnect structures are scaled down, EM-induced interconnect structure failure becomes more important because the interconnect structure's dimensions are reduced, with a corresponding increase in the current density through the interconnect. It is important for IC designs to have an acceptable reliability against EM-induced failure.

SUMMARY OF THE INVENTION

The disclosure provides a method of manufacturing an integrated circuit. The method comprises performing an electromigration reliability rule-check for at least one via node of an integrated circuit. Performing the rule-check includes calculating a net effective current density of the via node, including determining a sum of effective current densities for individual leads that are coupled to the via node. Leads configured to transfer electrons away from the via node are assigned a positive polarity of the effective current density. Leads configured to transfer electrons towards the via node are assigned a negative polarity of the effective current density.

Another embodiment is a method of manufacturing an integrated circuit that comprises specifying a design layout for the integrated circuit. The design layout includes proposed dimensions of a plurality of vias and leads in or on one or more interlayer dielectrics of the integrated circuit, and locations of via nodes formed by intersection of the vias and leads. The method also includes performing the above-described electromigration reliability rule-check for at least one of the via nodes. The rule-check further includes comparing the calculated net effective current density to a target effective current density. If the comparing reveals that the calculated net effective current density is outside of the target effective current density, then the design layout is changed so as to reduce the calculated net effective current density to a value that is within the target effective current density.

Still another embodiment is a computer system for checking electromigration reliability in an integrated circuit. The computer system comprises processing circuitry and storage circuitry for storing a plurality of files. The plurality of files comprises a program file and a circuit description file comprising a design layout of an integrated circuit. The design layout includes proposed dimensions of a plurality of vias and leads in or on one or more interlayer dielectrics of the integrated circuit and locations of via nodes formed by intersection of the vias and leads. The processing circuitry is programmed in response to the program file to calculate a net effective current density and compare the calculated net effective current density to a target effective current density. The processing circuitry is programmed to change the design layout so as to reduce the calculated net effective current density to a value that is within the target effective current density, if the comparison reveals that the calculated net effective current density is outside of the target effective current density difference.

BRIEF DESCRIPTION OF THE DRAWINGS

The disclosure is described with reference to example embodiments and to accompanying drawings, wherein.

DETAILED DESCRIPTION

The present disclosure provides an improved method to evaluate EM reliability limits based on allowable effective current densities flowing through interconnect structures. The term, EM reliability limit, refers to the maximum allowable current density that can be passed through an interconnect structure without having the interconnect fail (e.g., due to a disconnection) during the planned lifetime of the IC. Some rule-checking protocols to assess EM reliability limit involved determining whether or not the magnitude of the current density to be applied through individual leads was equal to or less than a maximum allowable current density for all leads in the IC.

The present invention recognizes, however, that merely considering the magnitude of the current density in individual leads often fails to accurately predict whether or not the EM reliability limit will be complied with. That is, accurate interconnect EM reliability assessment require more than simply determining the magnitude of current density in individual leads.

EM reliability limit is recognized in the present disclosure as further depending on the specific layout of leads on a via node. For instance, interconnect EM reliability depends upon whether individual leads are configured to direct electrons towards or away from the via node. Additionally, the effective current density for each lead of the via node should be considered. The term effective current density refers to current density passed through the lead multiplied by one or more factors. The factors account for situations when an individual lead's dimension or composition differs from that of other leads of the via node, and thereby affect the relative importance that the individual lead's intended current density has on EM reliability. A rule-checking protocol that takes these considerations into account allows for a more accurate assessments of interconnect EM reliability than previous protocols.

Figure 1:
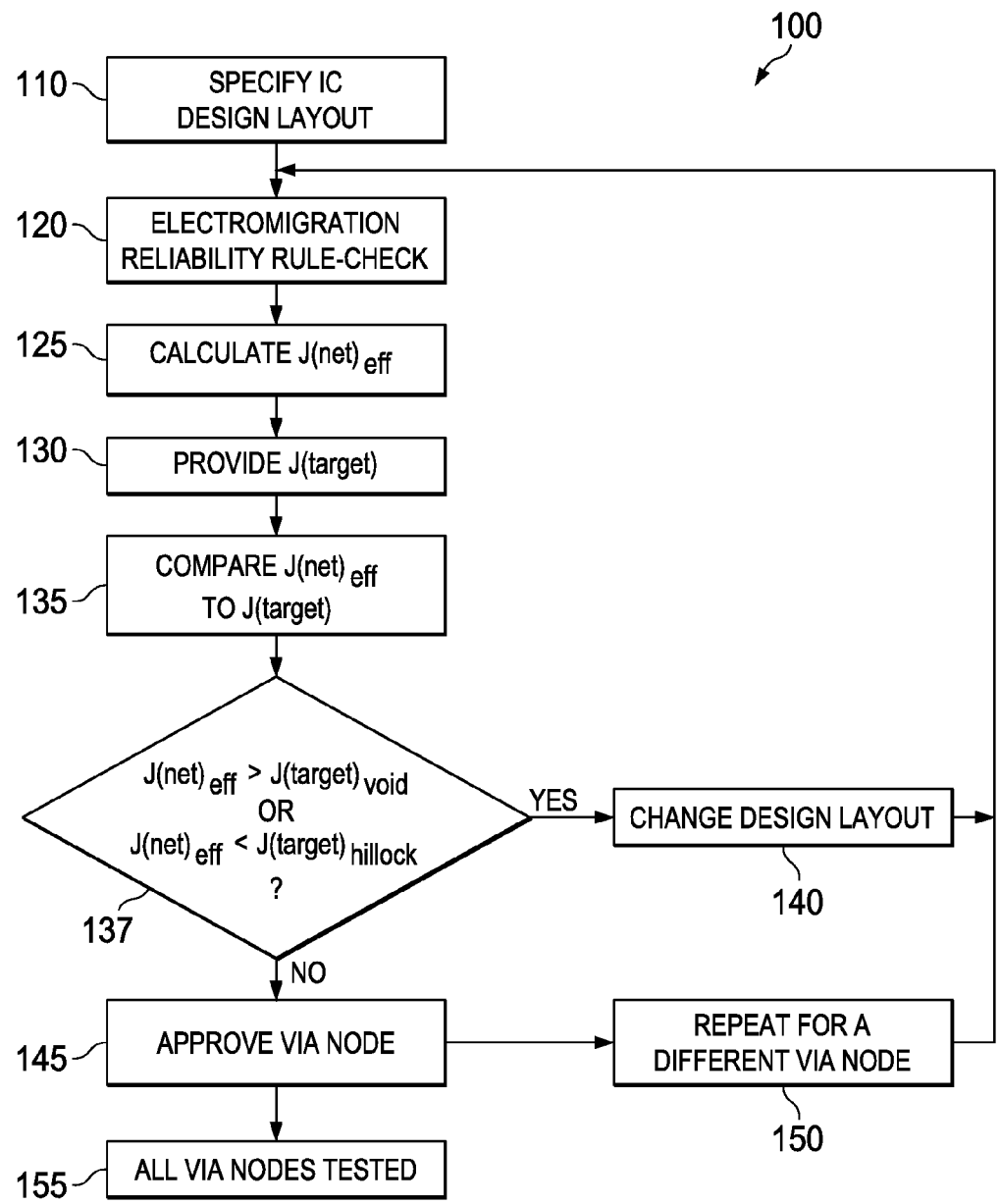
FIG. 1 illustrates by flow diagram, selected steps in an example method manufacturing an IC following the principles of the present disclosure.

FIG. 1 illustrates by flow diagram, selected steps in an example method 100 of manufacturing an IC following the principles of the present disclosure. The method 100 comprises a step 110 of specifying a design layout for an IC. The term design layout as used herein refers to the locations of active and passive device features on a semiconductor substrate (e.g., a silicon wafer), and the locations of interconnect structures (e.g., vias and leads) that interconnect the active and passive device features to each other. Example active and passive device features include transistors, resistors, capacitors, or other features well known to those skilled in the art.

The design layout specified in step 110 includes the proposed dimensions (e.g., width, length and height) of a plurality of via and leads in or on one or more insulating layers (e.g., interlayer dielectric layers, or intra-metal dielectric layers) of the IC. The design layout in step 105 also includes locations of via nodes formed by intersections between the vias and leads.

The term lead, as used herein, refers to any metal line that is formed on or in the insulating layers. The term, via, as used herein refers to metal-filled openings through individual insulating layers which thereby vertically couple leads in one insulating layer to leads in a overlying or underlying insulating layer. One of ordinary skill in the art would be familiar with the variety of different shapes and compositions that leads and vias could have. E.g., the leads or vias can include single or dual damacence structures, and can comprise copper, aluminum, or other metals, or metal alloys, commonly used to form a multilevel network of the IC. The term via node, as used herein, refers to the location where one or more leads in the insulating layer intersect with the same one or more vias.

The method 100 further comprises a step 120 of performing an EM reliability rule-check for at least one of the via nodes. Typically, the EM reliability rule check 120 is performed on all of the via nodes of an IC. The EM reliability rule-check 120 includes calculating (step 125) a net effective current density ($J(net)_{eff}$) of the via node.

The term $J(net)_{eff}$ as used herein refers to the sum of the effective current densities to be passed through the individual leads that are coupled to the via node, with consideration of the intended direction of current flow with respect to the via node. When the flow of electrons through a lead is away from the via node, then the current density is assigned a positive polarity, and thereby added to the sum of effective current densities. When the flow of electrons through a lead is towards the via node, then the current density is assigned a negative polarity, and thereby subtracted from the sum of effective current densities.

The EM reliability rule-check (step 120) also includes providing, in step 130, a target effective current density J(target). J(target) corresponds to the density loads thought to be required to cause EM-induced failure of the via node within the IC's projected lifetime. In some preferred embodiments, two J(target) values are provided: the target effective current density required for void formation ($J(target)_{void}$) and the target effective current density required for hillock formation ($J(target)_{hillock}$). $J(target)_{void}$ has a positive polarity because void formation results from atomic migration away from the via node. $J(target)_{hillock}$ has a negative polarity because hillock formation results from atomic migration towards the via node.

The target effective current densities can be provided from a specification for the IC under consideration using procedures that are well known to those skilled in the art. For example, to determine $J(target)_{void}$ and $J(target)_{hillock}$ an experimental circuit can be constructed and tested. The experimental circuit can have interconnects composed of the same materials and having the same dimensions as planned for the vias and leads in the IC. The test circuit can be tested under various current density loads until EM-induced failure in the circuit occurs within a predefined period, due to void formation (e.g., $J(target)_{void}$) or hillock formation (e.g., $J(target)_{hillock}$).

The EM reliability rule-check (step 120) further includes a step 135 of comparing $J(net)_{eff}$ to J(target) to determine whether or not if $J(net)_{eff}$ is outside of the J(target) value. In some cases, the comparison include determining, in step 137, if $J(net)_{eff} > J(target)_{void}$ or if $J(net)_{eff} < J(target)_{hillock}$. In some embodiments of the method, however, it may be permissible to provide just one of the above target effective current densities in step 130 and to compare $J(net)_{eff}$ to this single value in step 135. This might be the case e.g., when $J(net)_{eff} > J(target)_{void}$ would always apply before the $J(net)_{eff} < J(target)_{hillock}$ applies (step 137).

The EM reliability rule-check (step 120) further includes a step 135 of comparing $J(net)_{eff}$ to J(target) to determine whether or not $J(net)_{eff}$ is outside of the J(target) value. In some cases, the comparison includes determining, in step 137, if $J(net)_{eff} > J(target)_{void}$ or if $J(net)_{eff} < J(target)_{hillock}$. In some embodiments of the method, however, it may be permissible to provide just one of the above target effective current densities in step 130 and to compare $J(net)_{eff}$ to this single value in step 135. This might be the case, e.g., when $J(net)_{eff} > J(target)_{void}$ would always apply before the $J(net)_{eff} < J(target)_{hillock}$ applies (step 137).

The EM reliability rule-check (step 120) further includes a step 140 of changing the design layout such that the calculated $J(net)_{eff}$ is within J(target) target effective current density, when the comparison of step 135 reveals that $J(net)_{eff}$ is outside of J(target). In some embodiments, e.g., if it is determined in step 137 that either $J(net)_{eff} > J(target)_{void}$ or $J(net)_{eff} < J(target)_{hillock}$, then step 140 is performed. Step 140 can include, e.g., a design layout change that reduces the calculated $J(net)_{eff}$ to a value that is less than or equal to (e.g., less positive than) $J(target)_{void}$, or, to a value that is greater than or equal to (e.g., less negative than) $J(target)_{hillock}$, if $J(net)_{eff}$ is outside of the J(target) value.

In some cases, changing the design layout in step 140 can include increasing the proposed dimensions for one or more of the vias or leads of the via node. Increasing the proposed dimensions can include increasing or decreasing one or more or the length, height or width of the vias or leads. In some cases, it is desirable to only change the width of the lead or via because, e.g., the height is limited by the thickness of the insulating layers, and the length of the lead is limited by the locations of the underlying active and passive components that the vias and leads are required to interconnect to produce an operative IC. In still other cases, changing the design layout in step 140 can include changing the location of the via node. E.g., it may be advantage to change the location of the via node in cases where it desirable to change the length of a lead coupled to the via node.

Alternatively, if it is established, in decision step 135, that $J(net)_{eff}$ is not outside of the J(target) value (e.g., neither $J(net)_{eff} > J(target)_{void}$ nor $J(net)_{eff} < J(target)_{hillock}$ applies in step 137), then the via node is approved in step 145. The EM reliability rule-check (step 120) can then be repeated (step 150) for different via nodes until all of the via nodes of the IC are tested (stop step 155), modified by changing the design layout as per step 140, and eventually approved in step 145. In some cases, such as when a group of via nodes share leads, it may be desirable to perform EM reliability rule-check step 120 in an iterative fashion for each of the via nodes of the group to ensure that changing the design layout in step 135 for one via node does not have a detrimental effect on the EM reliability of another via node.

One skilled in the art would understand that if one were to use a negative polarity to represent electrons going-away, and positive polarity for electrons going-toward the via node, then the $J(target)_{void}$ and $J(target)_{hillock}$ would have the opposite signs as described above, and the determination of whether $J(net)_{eff}$ is outside of $J(target)$ would be changed accordingly (e.g., $J(net)_{eff} > J(target)_{hillock}$ or $J(net)_{eff} < J(target)_{void}$).

Figure 2:
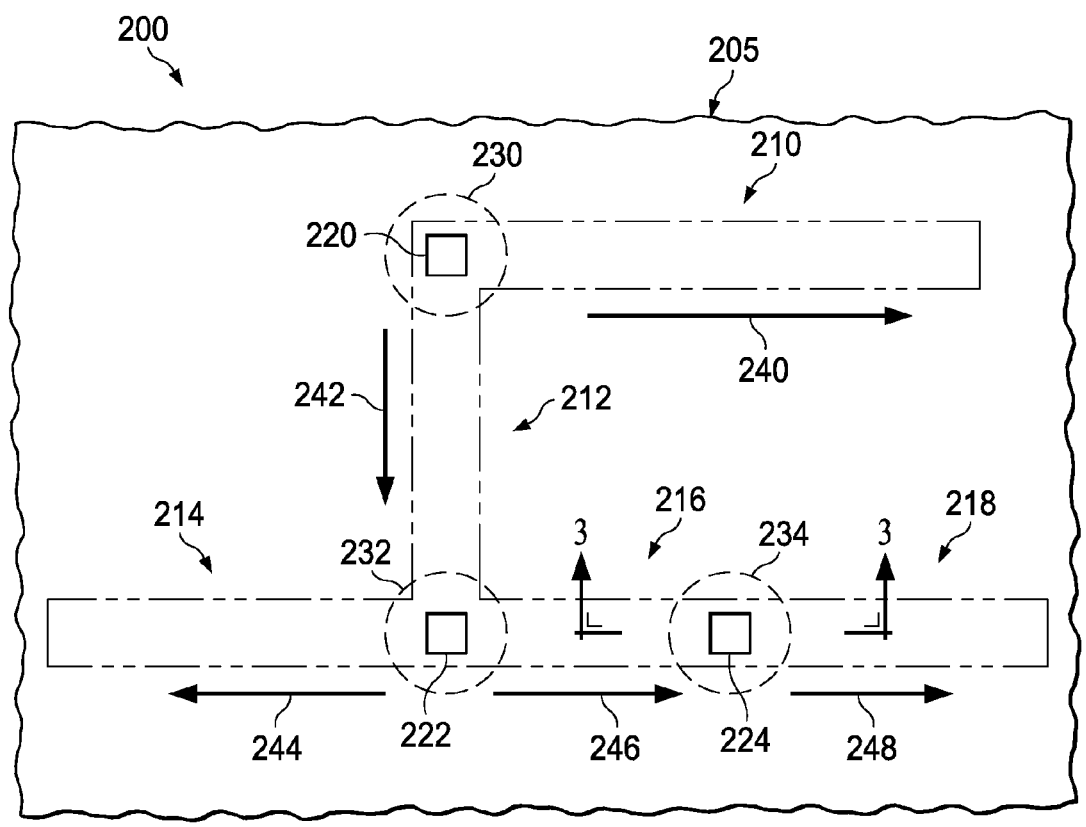
FIG. 2 shows a plan view of an example design layout for an IC to illustrate the method of manufacturing an IC described in the context of FIG. 1.
Figure 3:
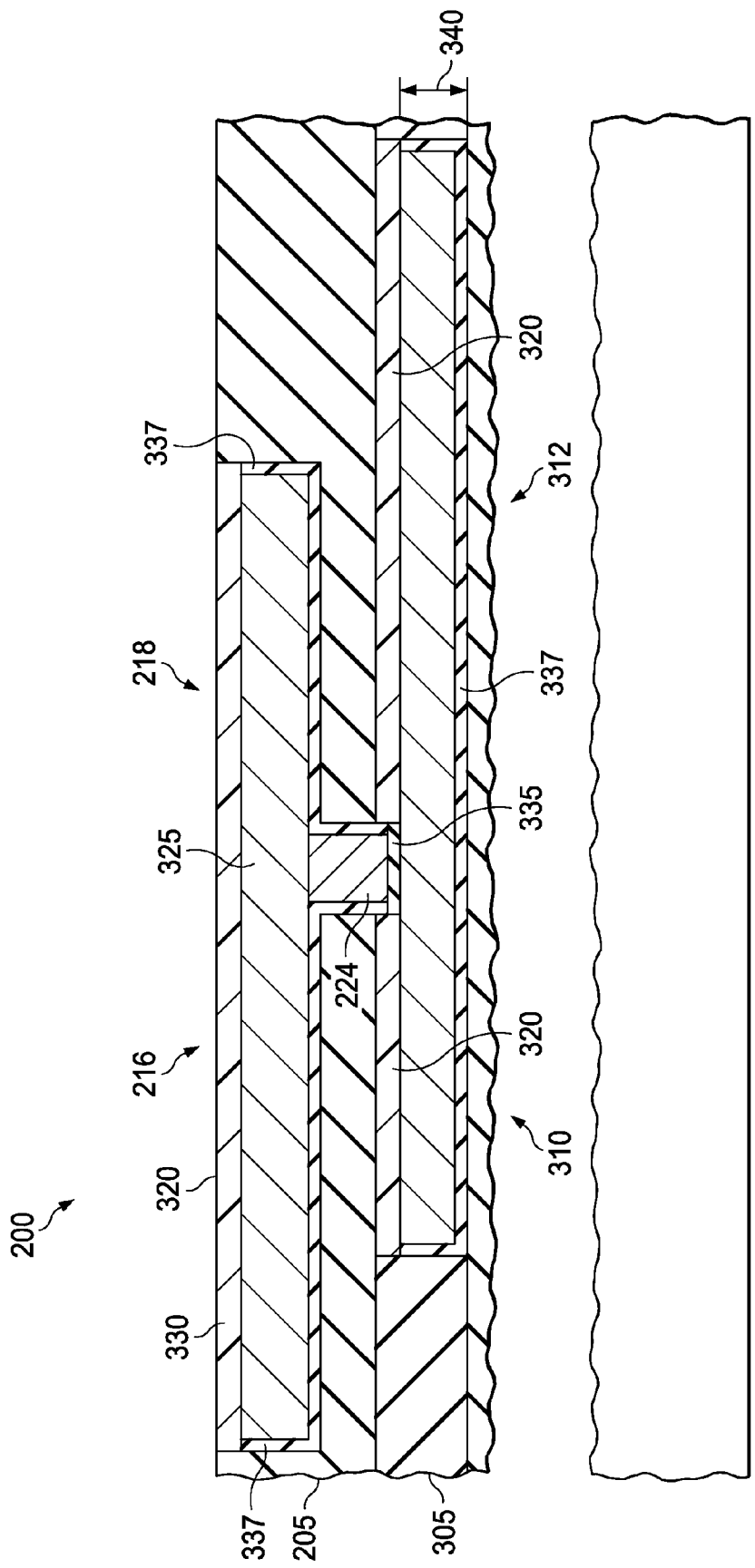
FIG. 3 shows a cross-sectional view of a portion of the example design layout presented in FIG. 2.

It is instructive to illustrate, by way of example, some of the principles of the method 100 presented above in the context of FIG. 1. In particular, the examples to follow illustrate aspects of calculating $J(net)_{eff}$ for a via node, in accordance with step 125. FIG. 2 shows a plan view of a portion of an example design layout for an IC 200. FIG. 3 shows a cross-sectional view of the IC 200 depicted in FIG. 2 (corresponding to view line 3-3 in FIG. 2).

FIG. 2 shows an insulating layer 205 having a plurality of leads 210, 212, 214, 216, 218 in or on the insulating layer 205. FIG. 2 also shows a plurality of vias 220, 222, 224 located under the leads 210, 212, 214, 216, 218. The leads 210, 212, 214, 216, 218 are depicted semi-transparently so that the underlying vias 220, 222, 224 are visible. As shown in FIG. 3, vias (e.g. via 224) pass vertically through an insulating layer 205 to interconnect the leads (e.g., leads 216, 218) to an underlying insulating layer 305 having leads 310, 312 in or on the underlying insulating layer 305. As also shown in FIG. 2, via nodes 230, 232, 234 are formed at the intersection of the leads and vias. E.g., via node 232 is formed by the intersection of leads 212, 214, 216 with via 222.

FIG. 2 further depicts the effective current density ($J_{eff}$) 240, 242, 244, 246, 248 for the leads 210, 212, 214, 216, 218 and the direction of electron flow relative to the via nodes via nodes 240, 242, 244. Consider via node 232 for the case where, e.g., $J_{eff}$ 242 equals 7 mAmp/μm², $J_{eff}$ 244 equals 9 mAmp/μm² and $J_{eff}$ 246 equals 9 mAmp/μm². In some cases $J(net)_{eff}$ can equal 11 mAmp/μm² (e.g., $J(net)_{eff}$=–$J_{eff}$ node 242 +$J_{eff}$ node 244 +$J_{eff}$ node 246).

The effective current density corresponds to the current density passed through a lead, or, the recovery effect included current density of the EM current waveform through the lead (e.g., $J_{lead}$) multiplied by one or more factors. After specifying the design of the IC (step 110) the designer can simulate or estimate the actual current density flowing, or, recovery effect included current density of the EM current waveform, through each lead, for the specific design condition. The relative importance that a particular lead's $J_{lead}$ value has on the EM reliability of the via node can be modified by at least three effects: a branch interaction effect, a width effect and a length effect. That is, when one or more of these of these effects is applicable, then the importance that the lead's $J_{lead}$ value has on the EM reliability is modified as compared to other leads of the via node. This relative change in the importance of a lead on EM reliability can be represented by a multiplication factor ranging from 1 (no attenuation) to less than 1 (attenuated impact), or to greater than 1 (enhanced impact). Each of the branch interaction effect, width effect and length effect for a lead can be assigned a factor ($F_B$, $F_W$, $F_L$, respectively) based on certain properties of the lead to characterize this impact.

Table 1 summarizes a rule-based interrelationship and values that these three factors ($F_B$, $F_W$, $F_L$) in the calculation of net effective current density for a via node in an example IC that includes lead "i."

TABLE 1

|  | Short | Mixed | Long |
|---|---|---|---|
| $F_B$ |  | $0 < F_B \leq 1$ |  |
| $F_W$ |  | $W_i/W_{min}$ |  |
| $F_L$ | $L_i/L_{max}$ | $L_i/L_{bs}$ or 1 | 1 |

The branch interaction factor ($F_B$) refers to the modification of a lead's $J_{lead}$ value on EM reliability due to the presence of barriers in the lead's current path. $F_B$ can range greater than zero to one. For leads where the EM-induced flux of atoms through the leads is unimpeded, $F_B$ equals 1. For leads where the EM-induced flux of atoms through the leads or via node is impeded, $F_B$ is between zero and one. One skilled in the art would understand how to determine the value of $F_B$ for a particular IC, e.g., by constructing experimental circuits and measuring the relative effects that model diffusion barrier layers of different compositions or widths have on EM-induced failure of the experimental circuit.

FIG. 3 shows example leads of an uppermost insulating layer 205 (e.g., lead 216 and lead 218) where the branch interaction factor equals one (e.g., $F_B$=1). For such leads, the EM-induced flux of atoms through the leads can occur predominately at the interface 320 between the lead body 325 (e.g., copper) and an etch stop layer 330 (e.g., SiCN, or similar materials know to serve as an etch stop layer). Because the flux of atoms at the interface 320 is substantially unimpeded, $F_B$ is assigned a value of one.

FIG. 3 also shows example leads of an underlying insulating layer 305 (e.g., leads 310, 312) that intersect with a via bottom diffusion barrier layer 335 (e.g., located at the bottom of an overlying via 224), where there can be a branch interaction factor of between one and zero (e.g., 0<$F_B$<1). E.g., the interface between the lead metal (e.g., Cu) and a copper diffusion barrier (e.g., Ta, TaN, or Ta and TaN) can partially disconnect EM-induced flux of copper atoms between the leads 310, 312. E.g., in the case where the via bottom diffusion barrier layer 335 comprises (or in some cases is composed of) Ta, TaN, or multi-layered combinations thereof, then $F_B$ can equal about 0.5. As also illustrated in FIG. 3, there can also be a trench diffusion barrier layer 337. In some cases, the trench diffusion barrier layer 337 can be composed of substantially the same material as the via bottom diffusion barrier layer 335. However, the effect of the trench diffusion barrier layer 337 on the flux of copper atoms between the leads 310, 312 can be much smaller (e.g., an order of magnitude or more smaller) than the effect from the via bottom diffusion barrier layer 335.

The particular value of $F_B$ will depend upon the composition diffusion barrier layer 335 and, more importantly, upon the width of the via bottom as compared to the width of the leads. For instance, if the width of the via bottom diffusion barrier layer 335 is substantially equal to the width of the leads 310, 312 (e.g., within 10 percent of the lead's width), then EM-induced flux of atoms through the leads will be maximally impeded. Accordingly an $F_B$ will be lower than the case where the width of the via bottom diffusion barrier layer 335 is substantially less (e.g., at least about 10 percent smaller width) than the width of the leads 310, 312.

Although in the above example the leads in the uppermost insulating layer have an $F_B$ of 1 and the leads in underlying insulating layers have an $F_B$ of between 0 and 1, the opposite could apply in other embodiments of the IC. E.g., in other cases, the uppermost insulating layer can have an $F_B$ of between 0 and 1 and leads in underlying insulating layers can have an $F_B$ of 1. In still other cases, both the uppermost and underlying insulating layers can have an $F_B$ of between 0 and 1, or both can have an $F_B$ of 1.

The width factor ($F_W$) refers to the modification of a lead's $J_{lead}$ value on EM reliability due to having a different width as compared to the width of other leads of the via node. For instance, the EM-induced flux of atoms away from a via node will give rise to faster void formation when the via intersects with a narrower lead width as compared to a wider lead width. The width factor equals the width of the lead of interest (e.g., $W_i$) divided by the width of the narrowest lead (e.g., $W_{min}$) of the via node (e.g., $F_W=W_i/W_{min}$). That is, $F_W$ can have a value ranging from one to greater than one. For instance, $F_W$ can equal one when the lead has a width that is substantially equal to (e.g., within about 5 percent) a minimum width among all the leads of the via node. Otherwise, if the lead's width is substantially greater than (e.g., greater than about 5 percent) the minimum width, then $F_W$ can equal the lead's width divided by a minimum lead width among all the leads of the via node.

Figure 4:
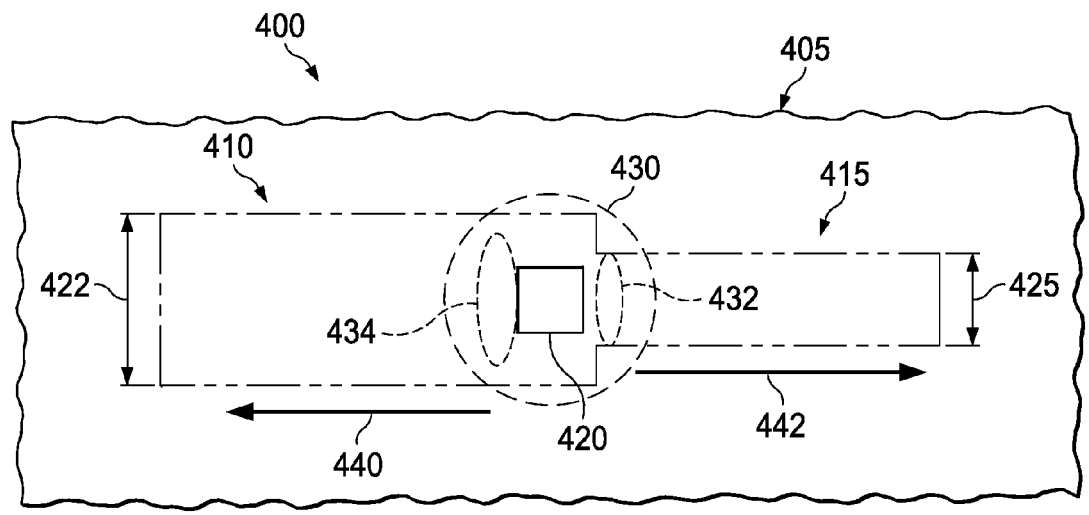
FIGS. 4-5 show a plan views of example design layouts for ICs to illustrate aspects of the method of manufacturing an IC described in the context of FIG. 1.

FIG. 4 shows a plan view of an example insulating layer 405 of an IC 400 having two leads 410, 415 of different widths that intersect a via 420. For illustrative purposes, the width 422 of lead 410 is twice the width 425 of lead 415. To accurately assess the EM reliability of the corresponding via node 430, it is important to consider the different widths 422, 425 of the leads 410, 415. For instance, when all other factors are equal, worst case void formation above the via 420 will occur in a shorter period in the region 432 adjacent to the narrower lead 415, and not in the region 434 adjacent to the wider lead 410. In this example, width 425 equals $W_{min}$, and the width 422 equals $2W_{min}$. Accordingly, the width factor for lead 410 equals 2 (e.g., $F_W=2W_{min}/W_{min}$), while the width factor for lead 415 equals 1 (e.g., $F_W=W_{min}/W_{min}$).

It is desirable to calculate the net effective current density ($J(net)_{eff}$) for the via node 430 using lead current densities ($J_{lead}$) that are adjusted by a width factor ($F_W$) such as estimated above. E.g., consider the example (FIG. 4) when the current density 440 through lead 410 equals $J_{lead1}$ and the current density 442 through lead 415 equals $J_{lead2}$, and the electron flow through both leads 410, 415 is away from the via node (i.e., both $J_{lead1}$ and $J_{lead2}$ are assigned positive polarities). Then $J(net)_{eff}=2J_{lead1}+J_{lead2}$.

One skilled in the art would appreciate that additional steps can be added or other steps removed as appropriate to calculate EM reliability. For instance, a factor similar to $F_W$ could be used to account for leads with different thicknesses (e.g., thickness 340 in FIG. 3), if appropriate. In the present discussion, it is assumed that all leads have the same thickness and therefore a thickness factor is not needed.

The length factor ($F_L$) refers to the attenuation of a lead's $J_{lead}$ value on EM reliability due to having a particular length that is equal to or less than the threshold length for back stress effects to occur. As well known to those skilled in the art, EM can cause mechanical stresses along the length of a lead, referred to herein as back stress effects. For a given current density, there can be a lead of sufficiently short threshold length ($L_{bs}$) at which the back stress effects can suppress the EM atomic flux in the lead within the lead's projected lifetime. One skilled in the art would understand how to determine the value of $L_{bs}$ for a particular IC, e.g., by constructing experimental circuits and measuring the EM-induced failure of the experimental circuit for different lead lengths.

To account for the different effects that EM-induced back stress can have on leads of different lengths, $F_L$ is assigned a value ranging from greater than zero to one, based on one of three different rules: long, short, and mixed (TABLE 1). When, for a given current density, the lengths of all of the leads of interest (e.g., $L_i$) that are directly coupled to the via node are greater than or equal to $L_{bs}$ (e.g., $L_i>L_{bs}$), then $F_L$ is assigned a value of 1 (see TABLE 1, "Long" Rule). When the length of all of the leads that are directly coupled to the via node are less than or equal to $L_{bs}$ (e.g., $L_i \leq L_{bs}$), then $F_L$ is assigned a value equal to the lead's length ($L_i$) divided by the length of maximum lead length among the leads of the via node ($L_{max}$). That is, $F_L=L_i/L_{max}$ (see TABLE 1, "Short" Rule). In some cases, one or more leads of the via node have a length that is less than $L_{bs}$ and one or more other leads of the via node have a length that is greater than $L_{bs}$. In these cases, the mixed Rule applies (TABLE 1, "Mixed" Rule). Under the mixed rule, for leads where $L_i>L_{bs}$, $F_L$ is assigned a value of 1, and for leads where $L_i \leq L_{bs}$, $F_L$ is assigned a value of $L_i/L_{bs}$.

In some cases, to better the ensure the EM reliability of a via node, it can be advantageous to modify the short rule by implementing it whenever the leads of the via node are within a length ($L_{short}$) that is less than or equal to $L_{bs}$. In such cases, the $J(net)_{eff}$ value is calculated in the same manner as described above and in accordance with step 135 (FIG. 1). However, $J(net)_{eff}$ is compared to different $J(target)$ values in step 140 (FIG. 1) than used for the comparison done for other via nodes that follow the long rule or the mixed rule. For instance, the $J(target)_{void}$ value used for via nodes tested under the short rule can be larger than the $J(target)_{void}$ value used for via node tested under the long and mixed rules.

In some cases, one or more of the individual leads considered in step 125 (FIG. 1) are indirectly coupled to the via node. That is, in addition to considering the leads that are directly coupled to the via node, leads that are indirectly coupled to the via node are included in the calculation of $J(net)_{eff}$. In some embodiments, an indirectly coupled lead is considered in the calculation of $J(net)_{eff}$ when that lead has a distance from the via node that is within $L_{bs}$. E.g., the calculation of $J(net)_{eff}$ also includes $J_{lead}$, and the factors ($F_B$, $F_W$ and $F_L$) for indirectly coupled leads, for all of those leads that extend up to $L_{bs}$. For the indirectly coupled leads, however, $F_B$ includes the branch interaction factor for the via node of interest and the branch interaction factor for all via nodes that are located in-between the indirectly coupled lead and the via node of interest.

In some preferred embodiments, all three of the factors ($F_B$, $F_W$, $F_L$) are evaluated and applied for each lead in a via node. Examples of such evaluations are presented below in the context of FIG. 5, which shows a plan view of an example insulating layer 505 of an IC 500. There are a plurality of leads 510, 512, 514, 516, 518 in or on the insulating layer 505 and a plurality of vias 521, 522, 523, 524, 525, 526 located under their respective leads 510, 512, 514, 516, 518. The examples to follow are directed to calculating $J(net)_{eff}$ for via node 530.

Figure 5:
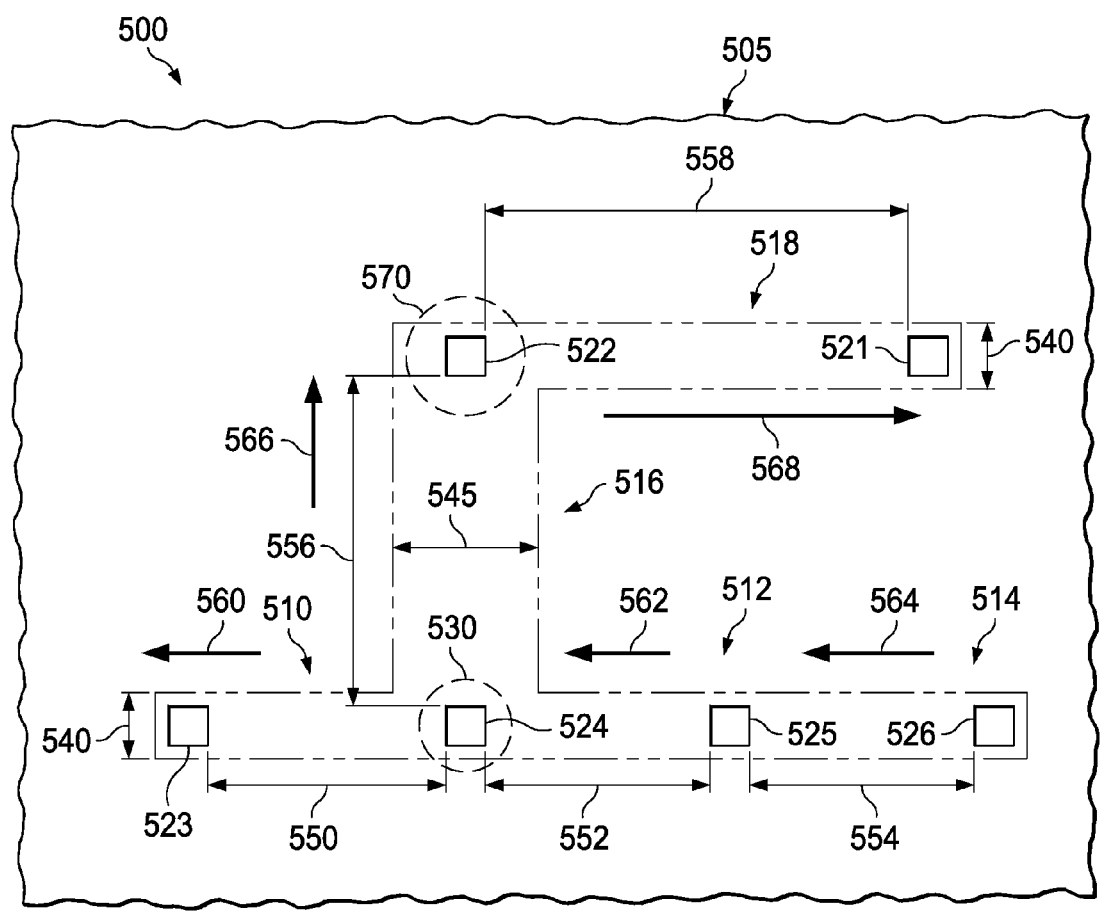

For the examples to follow, it is assumed that the all the leads 510, 512, 514, 516, 518 in the insulating layer 505 have an $F_B$ equal to 1. It is further assumed that all the leads 510, 514, 516, 518 have the same width 540 ($W_i$), except lead 512, which has double the width 545 ($2W_i$). Therefore $W_{min}=W_i$ and $F_W$ for leads 510, 514, 516, 518 all equal 1 (e.g., $W_i/W_{min}$), while $F_W$ for lead 516 equals 2 (e.g., $2W_i/W_{min}$). The leads 510, 512, 514, 516, 518 are assumed to have lengths 550, 552, 554, 556, 558 with values of $L_a$, $L_b$, $L_c$, $L_d$, $L_e$, respectively, and as further specified below. The current densities 560, 562, 564, 566, 568 passed through the leads 510, 512, 514, 516, 518, respectively, are assumed to have values of $J_a$, $J_b$, $J_c$, $J_d$, $J_e$, respectively, and their directions of electron flow are indicated in FIG. 5.

The examples to follow illustrate how the calculation of $J(net)_{eff}$ for via node 530 in accordance with step 125 (FIG. 1) would differ for different lead lengths.

Consider the case when the lengths 550, 552, 554, 556, 558 correspond to: $L_a=1$ µm, $L_b=3$ µm, $L_c=3$ µm, $L_d=2$ µm, $L_e=3$ µm, respectively. The lengths 550, 552, 556 ($L_a, L_b, L_d$) of the directly coupled leads 510, 512, 516 are all less than $L_{bs}$ (50 µm), and therefore the short rule applies. The indirectly coupled leads 514, 518 are within $L_{bs}$ and therefore these leads are also included in the calculation of $J(net)_{eff}$ for via node 530. The maximum lead length of the via node 530 equals 3 µm (e.g., lead 512) and therefore $L_{max}$ equals 3 µm.

As noted above, $J(net)_{eff}$ for a via node equals the sum of the current densities passed through leads of the via node ($J_{lead}$) multiplied by one or more factors (e.g., $F_B, F_W, F_L$). In the present example, the individual contribution to this sum for the directly coupled leads equals $J_{lead} F_B F_W F_L$ for each directly coupled lead. The individual contribution to this sum for the indirectly coupled leads equals $J_{lead} \Pi F_{Bk} F_W F_L$, for each indirectly coupled lead. The term, $\Pi F_{Bk}$, refers the branch interaction factor for the via node of interest plus all via nodes that are located in-between the indirectly coupled lead and the via node of interest. Consider, for instance, the indirectly coupled lead 518. In this case, both the branch interaction factor (e.g., $F_{B1}$) of the via node 530 of interest and the branch interaction factor (e.g., $F_{B2}$) of the via node 570 located in-between the indirectly coupled lead 518 and the via node 530 of interest are considered (e.g., k=2). Analogous considerations apply to the other indirectly coupled lead 514. Accordingly, for via node 530, $J(net)_{eff}$ equals: $J_a F_{Ba} F_{Wa} F_{La} - J_b F_{Bb} F_{Wb} F_{Lb} - J_c F_{Bc1} F_{Bc2} F_{Wc} F_{Lc} + J_d F_{Bd} F_{Wd} F_{Ld} + J_e F_{Be1} F_{Be2} F_{We} F_{Le}$, where the subscripts a, b, c, d and e signify that the $J_{lead}, F_B, F_W$ and $F_L$ values for each lead can be different from each other. Further simplifying, J(net)eff equals: $J_a 1 1 L_d/L_{max} - J_b 1 1 L_b/L_{max} - J_c 1 1 1 L_c/L_{max} + J_d 1 2 L_d/L_{max} + J_e 1 1 1 L_e/L_{max}$, or still further simplifying, $J_a/3 - J_b - J_c + 4J_d/3 + J_e$.

Consider another case when at least one of the lengths 550, 552, 556 ($L_a=20$ µ.m, $L_b=150$ µ.m, $L_d=200$ µm, respectively) of the leads 510, 512, 516 is less than $L_{bs}$ (e.g., 50 µm), and at least one of the lengths 550, 552, 556 is greater than $L_{bs}$. E.g., the length 550 of lead 510 is less than $L_{bs}$, and lengths 552, 556 of leads 512, 516 are greater than $L_{bs}$. In this case the mixed rule applies. $F_L$ equals 1 for leads 512, 516 because the lengths 552, 556 of these leads are greater than $L_{bs}$. $F_L$ equals $L_a/L_{bs}$ for lead 510 because the length 550 of this lead is less than $L_{bs}$. Therefore, for via node 530, $J(net)_{eff}$ equals: $J_a 1 1 L_a/L_{bs} - J_b 1 1 1 + J_d 1 2 1$, or simplifying, $J_a 1 1 20/50 - J_b 1 1 1 + J_d 1 2 1$, or further simplifying, $2J_a/5 - J_b + 2J_d$.

Consider yet another case when the lengths 550, 552, 556 ($L_a=60$ µm, $L_b=150$ µm, $L_d=200$ µm, respectively) of the leads 510, 512, 516 that are directly coupled to the via node 530 are all greater than $L_{bs}$ (e.g., 50 µm). In this case the long rule applies. $F_L$ equals 1 for leads 510, 512, 516 because the lengths 550, 552, 556 of these leads 510, 512, 516 are greater than $L_{bs}$. Therefore, for via node 530, $J(net)_{eff}$ equals: $J_a 1 1 1 - J_b 1 1 1 + J_d 1 2 1$, or simplifying, $J_a - J_b + 2J_d$.

Figure 6:
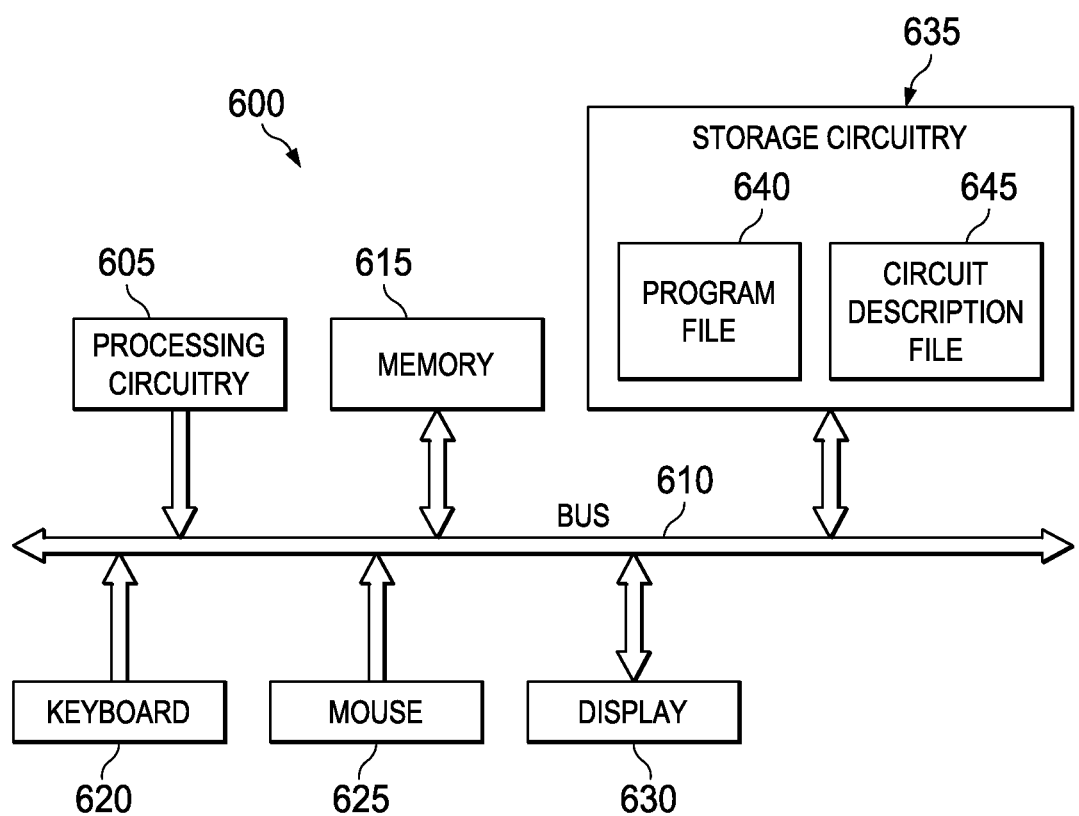
FIG. 6 presents a block diagram of an example computer system for checking electromigration reliability in an integrated circuit according to the principles of the present disclosure.

Another aspect of the present invention is a computer system. FIG. 6 presents a block diagram of an example computer system 600 for checking electromigration reliability in an integrated circuit according to the principles of the disclosure. The computer system 600 can comprise any conventional processing device capable of performing operations needed for circuit design, and include components well known to those skilled in the art. The computer system 600 including processing circuitry 605, such as a CPU, or other single or multiple processors. As illustrated in FIG. 6, the processing circuitry 605 can be coupled, via a bus 610, to a memory 615 capable of storing various types of data. The computer system 600 can further comprise one or more input/output devices, such as a keyboard 620, a mouse 625, and a video display 630.

The computer system 600 further comprises storage circuitry 635. The storage circuitry 635 can include various peripheral devices well known to one skilled in the art for storing and providing data. The storage circuitry 635 can comprise, e.g., a floppy disk drive, a hard disk drive, a CD ROM drive, or optical drive.

The storage circuitry 635 stores a plurality of files, including a program file 640, and a circuit description file 645. Various program languages well known to those skilled in the art may be used as the program file 640. The circuit description file 645 comprises data describing a design layout of an IC. The design layout comprises a description of a plurality of leads, vias and via nodes as defined by one or more design considerations of the circuit. In particular, the design includes dimensions of a plurality of vias and leads in or on one or more interlayer dielectrics of the IC, and the locations of via nodes formed by intersection of the vias and leads. The circuit description file 645 can further comprise additional information about the circuit including active devices (e.g., transistors comprising memory and logic transistors), passive devices (e.g., capacitors, inductors, resistors), and their interconnections through the leads and vias.

The computer system 600 can be programmed to check EM reliability of the via nodes such as described above in the context of FIG. 1 (e.g., step 120), by applying the program file 640, to the circuit description file 645. Information in the program file 640 and the circuit description file 645 is loaded into the memory 615, or other memory (e.g., within the processing circuitry 605). The processing circuitry 605 is programmed in response to the program file 640 to the steps of the method such as presented in FIG. 1.

For instance, the processing circuitry 605 can be programmed to determine a sum of effective current densities for individual leads that are coupled to the via node in accordance with step 125 (FIG. 1). The processing circuitry 605 can also be programmed to compare the calculated net effective current density to one or more target effective current densities ($J(target)_{void}$ or $J(target)_{hillock}$) in accordance with step 135. The target effective current density can be stored in the circuit description file 645. Processing circuitry 605 can be further programmed to change the design layout (e.g., by changing the width of a lead) in accordance with step 140 (FIG. 1), if the net effective current density is outside of the target effective current density. Or, the processing circuitry 605 can be programmed to accept the design layout, in accordance with step 145 (FIG. 1), when the calculated net effective current density is substantially within the target effective current density. E.g., the design layout is accepted when the calculated net effective current density is equal to or less than the target effective current density for void formation.

Although the present invention has been described in detail, those skilled in the art should understand that they can make various changes, substitutions and alterations herein without departing from the scope of the invention in its broadest form.

What is claimed is:

1. A method of manufacturing an integrated circuit, comprising:
specifying a design layout for said integrated circuit, said design layout including proposed dimensions of a plurality of vias and leads in or on one or more interlayer dielectrics of said integrated circuit, and locations of via nodes formed by intersection of said vias and said leads; and performing an electromigration reliability rule-check for at least one of said via nodes by using a computer, including:

calculating a net modified effective current density of said via node, including determining a sum of modified effective current densities for individual leads that are coupled to said via node, wherein:

said leads configured to transfer electrons away from said via node are assigned one of a positive or negative polarity of said modified effective current density, said leads configured to transfer electrons towards said via node are assigned the other of the positive or negative polarity of said modified effective current density, and said modified effective current density for each individual lead has a value that is substantially equal to a product of a current density passed through the individual lead multiplied by a relative importance factor determined by one or more of:

a) a branch interaction effect, which includes a modification of a current density value of a lead ($J_{lead}$) related to electromagnetic ("EM") reliability due to the presence of barriers in the lead's current path;

b) a width effect, wherein the relative importance factor of the width effect equals the width of the individual lead divided by the width of the narrowest lead of the via node, and c) a length effect, based on properties of the individual lead to generate a modified effective current density; said length effect assigned a value ranging from greater than zero to one, based on one of three different rules: long, short, and mixed length of the individual lead as compared to a threshold length of back stress effects to occur;

comparing said calculated net modified effective current density to a target effective current density for said via node, and changing said design layout such that said calculated net effective current density is within said target effective current density, if said comparing reveals that said calculated net modified effective current density is outside of said target effective current density for said via node wherein said modified effective current density for at least one of said leads is equal to a simulated current density multiplied by a branch interaction factor having a value ranging from greater than zero to one, and wherein said branch interaction factor is equal to one when said lead is located in an uppermost interlayer dielectric layer of said integrated circuit, and said branch interaction factor is between one and zero when said lead is located in an underlying interlayer dielectric layer of said integrated circuit and said lead intersects with a bottom diffusion barrier layer of an overlying via.

2. The method recited in claim 1, wherein comparing said calculated net modified effective current density to said target effective current density includes determining if said calculated net modified effective current is greater than said target effective current density for void formation, wherein a target effective current density that can create a void is assigned as a positive polarity, and an electron that enters the via node is assigned as a negative polarity.

3. The method recited in claim 1, wherein comparing said calculated net modified effective current density to said target effective current density includes determining if said calculated net modified effective current is less than said target effective current density for hillock formation, wherein a target effective current density that can create a hillock is assigned as a negative polarity, and an electron that enters the via node is assigned as a negative polarity.

4. The method recited in claim 1, wherein changing said design layout includes increasing said proposed dimensions for one or more of said vias or said leads, a count of one or more of said vias or said leads, or, changing said location of said via node.

5. A method of manufacturing an integrated circuit, comprising:

performing an electromigration reliability rule-check for at least one of via node of an integrated circuit by using a computer, including:

calculating a net effective current density of said via node, including determining a sum of modified effective current densities for individual leads that are coupled to said via node, wherein:

said leads configured to transfer electrons away from said via node are assigned one of a positive or negative polarity of said modified effective current density, said leads configured to transfer electrons towards said via node are assigned the other of the positive or negative polarity of said modified effective current density, and said modified effective current density for each individual lead has a value that is substantially equal to a product of a current density passed through the individual lead multiplied by a relative importance factor determined by one or more of a) a branch interaction effect, which includes a modification of a current density value of a lead ($J_{lead}$) related to electromagnetic ("EM") reliability due to the presence of barriers in the lead's current path;

b) a width effect, wherein the relative importance factor of the width effect equals the width of the individual lead divided by the width of the narrowest lead of the via node, and c) a length effect based on properties of the individual lead , said length effect assigned a value ranging from greater than zero to one, based on one of three different rules: long, short, and mixed length of the individual lead as compared to a threshold length of back stress effects to occur;

wherein said modified effective current density for at least one of said leads is equal to a simulated current density multiplied by a branch interaction factor having a value ranging from greater than zero to one, and wherein said branch interaction factor is equal to one when said lead is located in an uppermost interlayer dielectric layer of said integrated circuit, and said branch interaction factor is between one and zero when said lead is located in an underlying interlayer dielectric layer of said integrated circuit and said lead intersects with a bottom diffusion barrier layer of an overlying via.

6. The method recited in claim 5, wherein one or more of said individual leads are indirectly coupled to said via node.

7. The method recited in claim 5, wherein said modified effective current density for at least one of said leads is equal to a simulated current density multiplied by a width factor having a value ranging from one to greater than one.

8. The method recited in claim 7, wherein said width factor is equal to one when said lead has a width that is substantially equal to a minimum width among all said leads of said via node that are directly coupled to said via node.

9. The method recited in claim 7, wherein said width factor is equal to said lead's width divided by a minimum lead width among all said leads of said via node that are directly coupled to said via node.

10. The method recited in claim 5, wherein said modified effective current density for at least one of said leads is equal to a simulated current density multiplied by a length factor having a value ranging from greater than zero to one.

11. The method recited in claim 10, wherein said length factor is equal to one, when said lead has a length that is equal to or greater than a threshold length that causes back stress effects in said lead.

12. The method recited in claim 10, wherein said length factor is equal to said lead's length divided by a maximum lead length among all said leads of said via node, when all said leads have a length that is equal to or less than a threshold length that causes back stress effects in said leads.

13. The method recited in claim 10, wherein said length factor is equal to said lead's length divided by a threshold length, if the lead's length is less than a threshold length; and wherein ,if said lead's length is equal to or greater than the threshold length, the length factor is equal to one.

14. The method recited in claim 5, wherein said modified effective current density for at least one of said leads is equal to a simulated current density multiplied by a branch interaction factor, a width factor and a length factor.

15. A computer system for checking electromigration reliability in an integrated circuit, comprising:
    processing circuitry; and
    storage circuitry for storing a plurality of files, said plurality of files comprising:
        a circuit description file comprising design layout of an integrated circuit, wherein said design layout includes including proposed dimensions of a plurality of vias and leads in or on one or more interlayer dielectrics of said integrated circuit, and locations of via nodes formed by intersection of said vias and said leads; and
        a program file stored on a non-transitory computer readable storage medium;
    wherein said processing circuitry is programmed in response to execution of said program file by the computer system to:
        calculate a net modified effective current density of said via node, including determining a sum of modified effective current densities for individual leads that are coupled to said via node, wherein said leads configured to transfer electrons away from said via node are assigned one or a positive or negative polarity of said modified effective current density, said leads configured to transfer electrons towards said via node are assigned the other of the positive or negative polarity of said modified effective current density, and
    said modified effective current density for each individual lead has a value that is substantially equal to a product of a current density passed through the individual lead multiplied by a relative importance factor determined by one or more of
        a) a branch interaction effect, which includes a modification of a current density value of a lead ($J_{lead}$) related to electromagnetic ("EM") reliability due to the presence of barriers in the lead's current path;
        b) a width effect ,wherein the relative importance factor of the width effect equals the width of the individual lead divided by the width of the narrowest lead of the via node, and
        c) a length effect based on properties of the individual lead, said length effect assigned a value ranging from greater than zero to one, based on one of three different rules: long, short, and mixed length of the individual lead as compared to a threshold length of back stress effects to occur
    compare said calculated net modified effective current density to a target effective current density for said via node, and
    change said design layout such that said calculated net modified effective current density is within said target effective current density, if said comparison reveals that said calculated net modified effective current density is outside of said target effective current density for said via node wherein said modified effective current density for at least one of said leads is equal to a simulated current density multiplied by a branch interaction factor having a value ranging from greater than zero to one, and
    wherein said branch interaction factor is equal to one when said lead is located in an uppermost interlayer dielectric layer of said integrated circuit, and said branch interaction factor is between one and zero when said lead is located in an underlying interlayer dielectric layer of said integrated circuit and said lead intersects with a bottom diffusion barrier layer of an overlying via.

16. The computer system recited in claim 15, wherein said modified effective current density for at least one of said leads is equal to a simulated current density multiplied by a branch interaction factor, a width factor and a length factor.

17. The computer system recited in claim 15, wherein said processing circuitry is programmed in response to said program file to accept said design layout when said calculated net modified effective current density is substantially within said target effective current density.

18. The computer system recited in claim 15, wherein changing said design layout includes increasing a width for one or more of said leads.

19. A method of manufacturing an integrated circuit, comprising:
    specifying a design layout for said integrated circuit, said design layout including proposed dimensions of a plurality of vias and leads in or on one or more interlayer dielectrics of said integrated circuit, and locations of via nodes formed by intersection of said vias and said leads; and
    performing an electromigration reliability rule-check for at least one of said via nodes by using a computer, including:
        calculating a net effective modified current density of said via node, including determining a sum of modified effective current densities for individual leads that are coupled to said via node, wherein:
            said leads configured to transfer electrons away from said via node are assigned one of a positive or negative polarity of said modified effective current density,
            said leads configured to transfer electrons towards said via node are assigned the other of the positive or negative polarity of said modified effective current density, and
            said modified effective current density for each individual lead has a value is substantially equal to a product of current density passed through the individual lead multiplied by a relative importance factor determined by one or more of:
a) a branch interaction effect which includes a modification of a current density value of a lead ($J_{lead}$) related to electromagnetic ("EM") reliability due to the presence of barriers in the lead's current path;
b) a length effect, based on properties of the individual lead to generate a modified effective current density, said length effect assigned a value ranging from greater than zero to one, based on one of three different rules: long, short, and mixed length of the individual lead as compared to a threshold length of back stress effects to occur;

comparing said calculated net modified effective current density to a target effective current density for said via node, and changing said design layout such that said calculated net modified effective current density is within said target effective current density, if said comparing reveals that said calculated net modified effective current density is outside of said target effective current density for said via node, wherein said modified effective current density for at least one of said leads is equal to a simulated current density multiplied by a branch interaction factor having a value ranging from greater than zero to one, and wherein said branch interaction factor is equal to one when said lead is located in an uppermost interlayer dielectric layer of said integrated circuit, and said branch interaction factor is between one and zero when said lead is located in an underlying interlayer dielectric layer of said integrated circuit and said lead intersects with a bottom diffusion barrier layer of an overlying via.

20. The method of claim 19, wherein said modified current density passed through the individual lead is further multiplied by a relative importance factor determined by a width effect.

* * * * *